US009701277B2

(12) United States Patent
McIntyre et al.

(10) Patent No.: US 9,701,277 B2
(45) Date of Patent: Jul. 11, 2017

(54) ACTIVE HINGE WITH DEPLOYED POSITION LATCH

(71) Applicant: Magna Closures Inc., Newmarket (CA)

(72) Inventors: Andrew Reginald McIntyre, Victoria Harbour (CA); John T. Shier, Penetangushiene (CA); Dikran Ghorghorian, Scarborough (CA)

(73) Assignee: MAGNA CLOSURES INC., Newmarket (CA)

( * ) Notice: Subject to any disclaimer, the term of this patent is extended or adjusted under 35 U.S.C. 154(b) by 0 days.

(21) Appl. No.: 15/044,230

(22) Filed: Feb. 16, 2016

(65) Prior Publication Data

US 2016/0245003 A1 Aug. 25, 2016

Related U.S. Application Data

(60) Provisional application No. 62/120,611, filed on Feb. 25, 2015.

(51) Int. Cl.
| | | |
|---|---|---|
| *B60K 28/10* | (2006.01) | |
| *B60R 21/38* | (2011.01) | |
| *E05D 11/00* | (2006.01) | |

(52) U.S. Cl.
CPC ........ B60R 21/38 (2013.01); *E05D 2011/009* (2013.01); *E05Y 2900/536* (2013.01)

(58) Field of Classification Search
CPC .............. B60R 21/38; E05D 2011/009; Y10T 16/5404; Y10T 16/53833; Y10T 16/5476
USPC ................ 180/69.2, 69.21, 274; 296/187.04; 292/337, 340
See application file for complete search history.

(56) References Cited

U.S. PATENT DOCUMENTS

| | | | | |
|---|---|---|---|---|
| 6,106,033 A | * | 8/2000 | Ruckert | E05B 83/16 292/216 |
| 7,195,090 B2 | | 3/2007 | Parks et al. | |
| 7,261,337 B2 | * | 8/2007 | Nakagome | E05B 83/24 292/216 |
| 7,845,053 B2 | * | 12/2010 | Marsh | E05D 11/06 16/286 |
| 8,484,804 B2 | * | 7/2013 | Mehta | B60R 21/38 16/368 |
| 8,544,590 B2 | | 10/2013 | McIntyre | |
| 8,573,658 B2 | | 11/2013 | Kim | |
| 8,579,068 B2 | | 11/2013 | Farooq et al. | |
| 8,584,787 B2 | | 11/2013 | Hwang | |
| 8,939,249 B2 | | 1/2015 | Kuhr et al. | |
| 9,340,179 B2 | * | 5/2016 | Kim, II | B60R 21/38 |
| 2007/0151791 A1 | * | 7/2007 | Gust | B60R 21/38 180/274 |
| 2008/0189015 A1 | * | 8/2008 | Borg | B62D 25/12 701/45 |
| 2009/0223360 A1 | * | 9/2009 | Aoki | B60R 21/38 92/15 |
| 2010/0024162 A1 | * | 2/2010 | Walz | B60R 21/38 16/233 |
| 2014/0182962 A1 | * | 7/2014 | McIntyre | B60R 21/38 180/274 |
| 2015/0054293 A1 | | 2/2015 | Kim et al. | |

* cited by examiner

*Primary Examiner* — Toan To
(74) *Attorney, Agent, or Firm* — Dickinson Wright PLLC (57) ABSTRACT

An active hinge for a deployable hood assembly of the type used in a pedestrian protection system for motor vehicles. The active hinge employs a primary latch to mechanically hold the hinge in a non-deployed condition and a secondary latch to mechanically hold the hinge in a deployed condition.

20 Claims, 10 Drawing Sheets

ACTIVE HINGE WITH DEPLOYED POSITION LATCH

CROSS REFERENCE TO RELATED APPLICATIONS

This application claims the benefit of U.S. Provisional Patent Application Ser. No. 62/120,611 filed on Feb. 25, 2015, and titled "ACTIVE HINGE WITH DEPLOYED POSITION LATCH", the entire disclosure of which is hereby incorporated by reference.

FIELD OF THE INVENTION

The present disclosure relates generally to pedestrian protection systems for motor vehicles of the type having a deployable hood assembly equipped with active hinges. More particularly, the present disclosure is directed to an active hinge for use with a deployable hood assembly and which has a latching mechanism operable for releaseably holding the hinge in its non-deployed and deployed conditions.

BACKGROUND OF THE INVENTION

This section provides background information related to the present disclosure which is not necessarily prior art.

In recent years, a great deal of emphasis has been directed to development of pedestrian protection systems for use in motor vehicles in an effort to reduce the likelihood or severity of injuries caused during a collision between a pedestrian and a motor vehicle. One such area of development has been directed to equipping the motor vehicle with a hood assembly capable of absorbing impact forces.

A "passive" pedestrian protection system associated with the hood assembly includes providing a pocket of under-hood crush space between the hood and the components within the vehicle's engine compartment. This crush space is configured to reduce the chance of bodily impact with the components within the engine component and, more particularly, to provide an impact absorbing feature. However, the use of low profile hoods in modern motor vehicles for improved aesthetics and aerodynamics, in combination with smaller engine compartments, limits the available crush space.

As an alternative, an "active" pedestrian protection system associated with the vehicle's hood assembly provides a "deployable" hood that is configured to raise a rear portion of the latched hood to create the additional under-hood crush space. This deployable hood feature is activated in response to detection of a pedestrian collision with the front end of the motor vehicle. Typically, a pair of active hinges are incorporated into the hood assembly. Each active hinge includes a pivot linkage interconnecting the hood to the vehicle body and an actuator that is operable to forcibly move the pivot linkage for causing the hood to move from a non-deployed position to a deployed position in response to detection of the pedestrian impact. Examples of active hinges that provide this functionality are disclosed in commonly-owned U.S. Pat. No. 8,544,590 and U.S. Publication No. 2014/0182962.

In some active hinges, the actuator is used to hold the hood in its deployed position. For example, some active hinges use a pyrotechnic actuator which typically requires controlled venting to maintain the upward force that is applied to the pivot linkage. To this end, a need exists to provide alternative solutions for locating and retaining the hood in its deployed position which address and overcome shortcomings of conventional active hinges.

SUMMARY OF THE INVENTION

This section provides a general summary of the disclosure and is not intended to be interpreted as a comprehensive listing of its full scope or of all of its objects, aspects, features and/or advantages.

It is an aspect of the present disclosure to provide an active hinge for use in a vehicle hood assembly including a pivot linkage mechanism interconnecting the hood to the vehicle body and a latching mechanism having a primary latch for normally holding the pivot linkage mechanism in a first or "pre-deployed" state and a secondary latch for holding the pivot linkage mechanism in a second or "deployed" state.

It is a further aspect of the present disclosure to provide the active hinge with a method for resetting the latching mechanism after movement of the pivot linkage mechanism from its deployed state back into its pre-deployed state.

In accordance with these and other aspects of the present disclosure, an active hinge is provided comprised of: a hood bracket for attachment to a vehicle hood; a body bracket for attachment to a vehicle body; a deploy bracket pivotably attached to the hood bracket and the body bracket, the hood bracket being pivotable relative to the deploy bracket between a non-deployed position and a deployed position; a latch mechanism having a primary latch operable for releaseably latching the hood bracket to the deploy bracket in the non-deployed position and a secondary latch operable for releaseably latching the hood bracket to the deploy bracket in the deployed position; and an actuator for releasing the primary latch and permitting movement of the hood bracket to its deployed position.

According to another aspect of the disclosure, a further active hinge is provided comprised of: a hood bracket for attachment to a vehicle hood; a body bracket for attachment to a vehicle body; a deploy bracket pivotably attached to the hood bracket and the body bracket, the hood bracket being pivotable relative to the deploy bracket between a non-deployed position and a deployed position, wherein the hood bracket is generally disposed in alignment with the deploy bracket in the non-deployed position, and wherein the hood bracket is pivoted relative to the deploy bracket in the deployed position; an upstop pin fixed to and extending from the deploy bracket; a primary latch pivotably attached to the deploy bracket and moveable between a latched position and a released position, wherein the primary latch engages the hood bracket when the primary latch is in the latched position to secure the hood bracket in the non-deployed position, and wherein the primary latch is spaced from the hood bracket when the primary latch is in the released position to permit the hood bracket to pivot relative to the deploy bracket into the deployed position; a secondary latch pivotably connected to the hood bracket and moveable between a latched position and a released position, wherein the secondary latch engages the upstop pin in the latched position to retain the hood bracket in the deployed position, and wherein the secondary latch is spaced from the upstop pin in the released position to permit movement of the hood bracket out of said deployed position; and an actuator for releasing the primary latch and permitting movement of the hood bracket to its deployed position.

According to yet another aspect of the disclosure, a method for operating an active hinge is provided, comprised of: providing a hood bracket for attachment to a vehicle hood; providing a body bracket for attachment to a vehicle body; providing a deploy bracket pivotably attached to the hood bracket and the body bracket and having an upstop pin extending therefrom; providing a primary latch being pivotably attached to the deploy bracket; providing a secondary latch being pivotably attached to the hood bracket and defining a capture slot; pivoting the primary latch relative to the deploy bracket from a latched position to a released positon, wherein the primary latch engages the hood bracket in the latched position to secure the hood bracket to the deploy bracket in a non-deployed position of the hood bracket, and wherein the primary latch is spaced from the hood bracket in the released position to allow the hood bracket to pivot relative to the deploy bracket into a deployed position of the hood bracket; and pivoting the hood bracket relative to the body bracket in a first direction from the non-deployed position into the deployed position and receiving the upstop pin in the capture slot of the secondary latch to retain the hood bracket in the deployed position.

Further areas of applicability will become apparent from the description provided. The description and specific examples in this summary are intended for purposes of illustration only and are not intended to limit the scope of the present disclosure.

DRAWINGS

The drawings described herein are for illustrative purposes only of selected embodiments and not all possible implementations thereof such that the drawings are not intended to limit the scope of the present disclosure.

Corresponding reference numerals indicate corresponding parts throughout the several view of the drawings.

DETAILED DESCRIPTION

Example embodiments of a vehicle hood assembly having a hood and at least one active hinge embodying the teachings of the present disclosure will now be described more fully with reference to the accompanying drawings. However, the example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that the example embodiments may be embodied in many different forms and that neither should be construed to limit the scope of the disclosure. In some example embodiments, well-known processes, well-known device structures, and well-known technologies are not described in detail.

As will be detailed, the active hinges of the present disclosure are used as part of a hood assembly for a pedestrian protection system on motor vehicles. More specifically, active hinges of the type disclosed herein are used for mounting a vehicle hood to a vehicle body in an effort to introduce an additional degree of freedom in the movement of the vehicle's hood when a pedestrian is struck by the vehicle to reduce the severity of injuries sustained when the pedestrian contacts the vehicle's hood.

Figure 1:
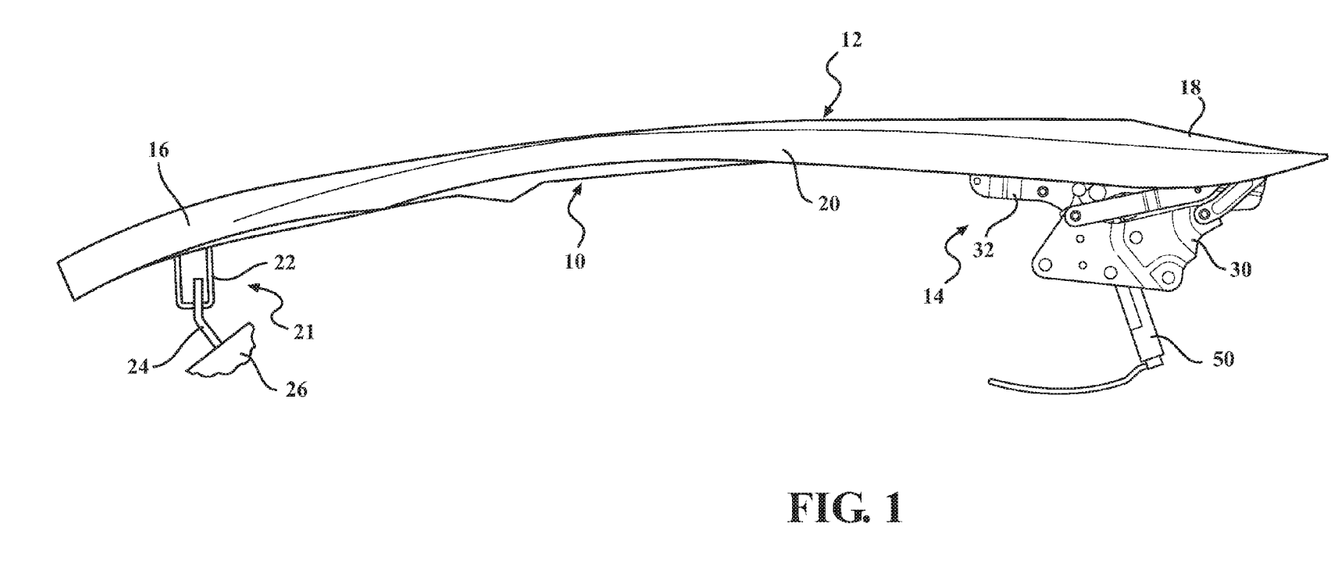
FIG. 1 is a side elevational view of a vehicle hood assembly having a hood and an active hinge constructed in accordance with the present disclosure and showing the vehicle hood assembly located in a normal-closed position with the hood in a latched condition and the active hinge in a non-deployed condition.

FIG. 1 illustrates a side elevational view of a vehicle hood assembly 10 generally configured to include a hood 12 and at least one active hinge 14. The term "vehicle" is intended to broadly encompass any car, truck, SUV, van or any other type of passenger carrying vehicle. Hood assembly 10 is configured to overlie an engine compartment of the vehicle, as defined by the vehicle's body. Hood 12 is shown to include a front segment 16, a rear segment 18 and a pair of laterally-spaced side segments 20. As is conventional, front segment 16 of hood 12 is configured to be located proximate to a front portion of the vehicle while rear segment 18 of hood 12 is configured to be located proximate to the vehicle's windshield.

In accordance with one example embodiment, a pair of active hinges 14 (only one shown) are associated with hood assembly 10, each being located adjacent to one of side segments 20 of hood 12 and being configured to allow hood 12 to pivot between an open position with front segment 16 elevated to provide access to engine compartment and a normal-closed position whereat hood 12 is lowered to provide an unobstructed view for the person operating the vehicle. FIG. 1 illustrates active hinge 14 positioned such that hood 12 pivots in proximity to its rear segment 18. The vehicle is also equipped with a hood latching device 21 shown to include a striker 22 fixed to an underside portion of front segment 16 of hood 12 and a latch 24 mounted to a structural portion 26 of the vehicle's body. In particular, FIG. 1 illustrates striker 22 engaged and held by latch 24 so as to located hood assembly 10 in its normal-closed position with active hinge 14 maintained in a "non-deployed" condition, whereby front segment 16 of hood is latched and rear segment 18 of hood 12 is located in its conventional lowered position.

Figure 2:
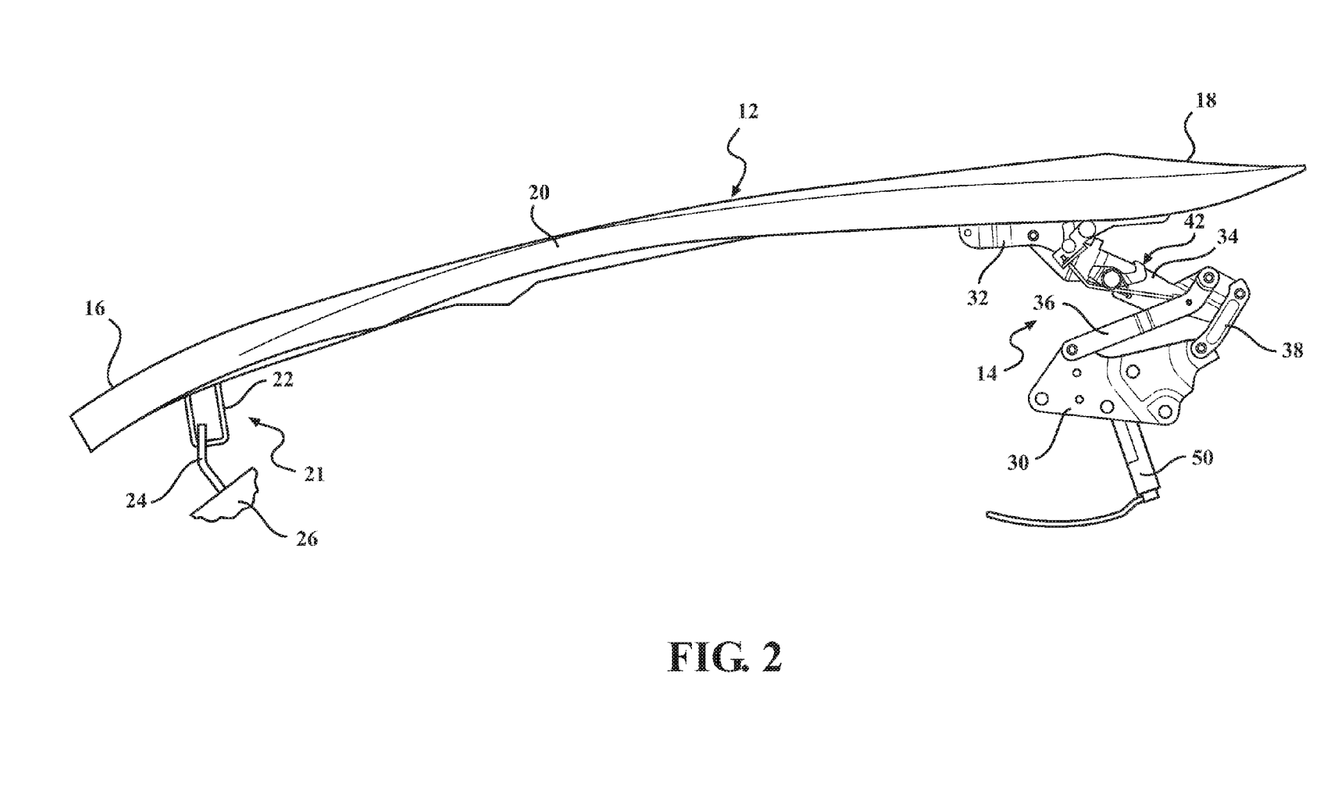
FIG. 2 is a similar side elevational view now showing the vehicle hood assembly in a deployed position with the hood maintained in its latched condition and its rear edge segment raised and with the active hinge in a deployed condition.

As will be detailed, active hinge 14 includes a pedestrian protection device that functions automatically in the event of a vehicle impact with a pedestrian. Specifically, the pedestrian protection device functions to shift active hinge 14 from its non-deployed state into a "deployed" condition, as shown in FIG. 2, where rear segment 18 of hood 12 is moved to a raised or deployed position while front segment 16 of hood 12 remains latched via latching device 21. Thus, active hinge 14 provides an additional degree of freedom in its movement to permit rear segment 18 of hood 12 to move from its normal lowered position (FIG. 1) into its raised position (FIG. 2). As will also be detailed, under normal (i.e., pre-collision) situations, this additional degree of freedom is disabled by a primary latch of a latching mechanism associated with active hinge 14 which, in turn, permits normal usage of hood 12. Normal usage is understood to mean pivotal movement of hood 12 between its normally-closed position of FIG. 1 and a normally-opened position (not shown) with active hinge 14 maintained in its non-deployed state. Release of the primary latch (via an actuator) functions to initiate shifting of active hinge 14 from its non-deployed state to its deployed state.

Active hinge 14 is configured to allow this additional degree of freedom in the movement of hood 12 in response to a vehicle/pedestrian collision, but without active hinge 14 deforming or absorbing energy during the collision. In addition, active hinge 14 provides a means for mechanically maintaining its deployed condition via a secondary latch 46 of the latching mechanism upon hood 14 being unlatched following the collision event. Furthermore, a reset function is provided by which the secondary latch is released and the primary latch is engaged so as to return active hinge 14 to its non-deployed condition.

Figure 3:
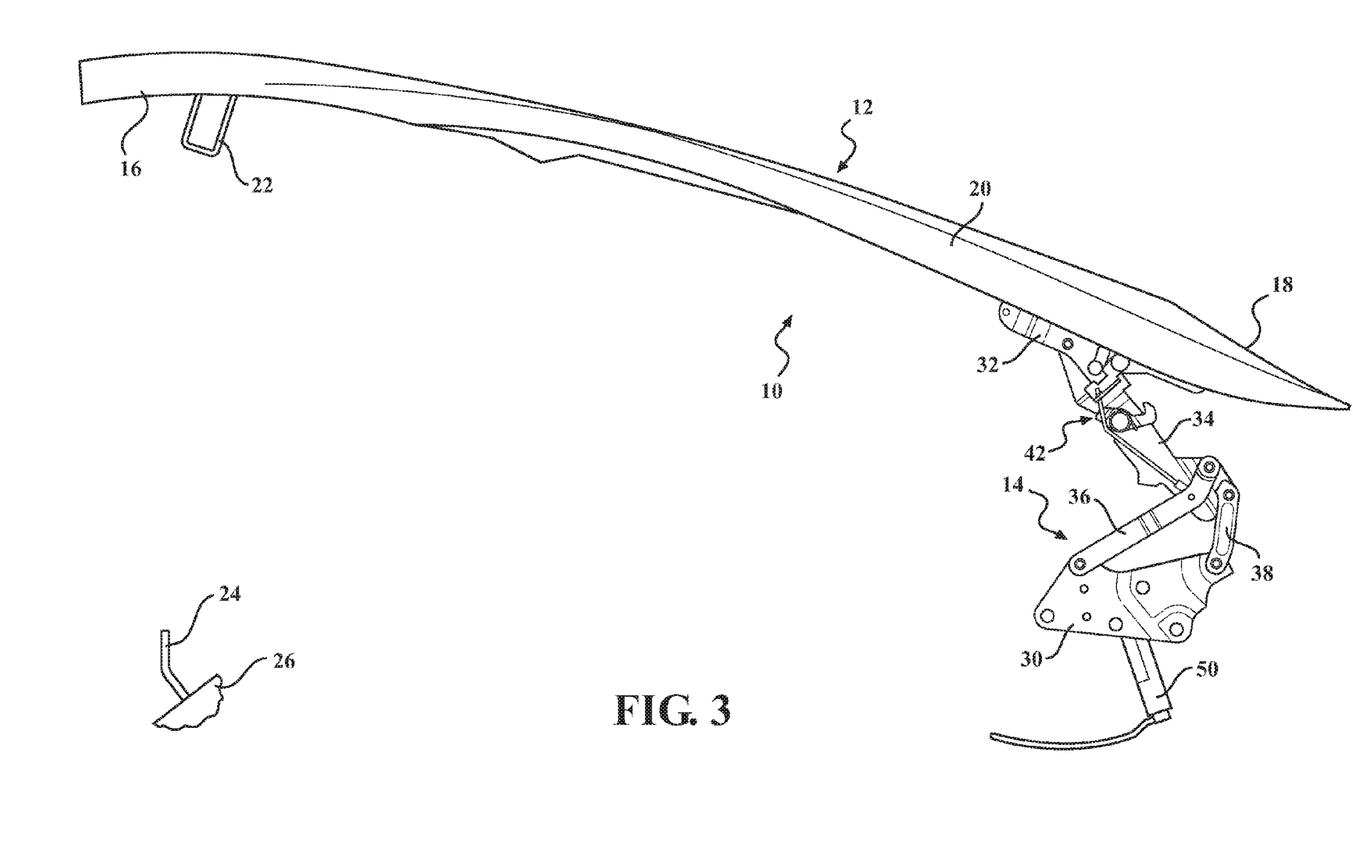
FIG. 3 is another similar side elevational view now showing movement of the vehicle hood assembly to an unlatched position with the hood in a released condition and pivoted to an intermediate open position while the active hinge is maintained in its deployed condition.
Figure 4:
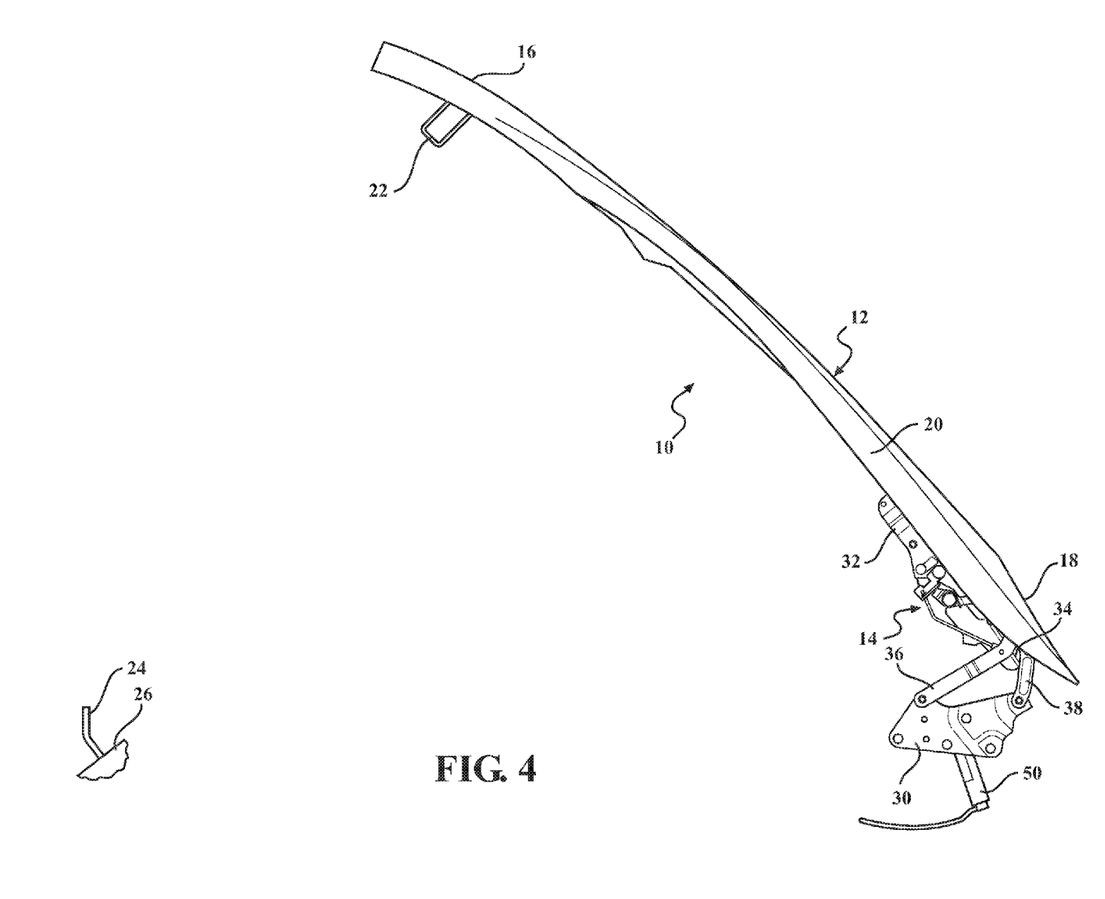
FIG. 4 is yet another side elevational view showing of the vehicle hood assembly moved to a reset position with the hood pivoted further to a fully open position for shifting the active hinge from its deployed condition into its non-deployed condition.
Figure 5:
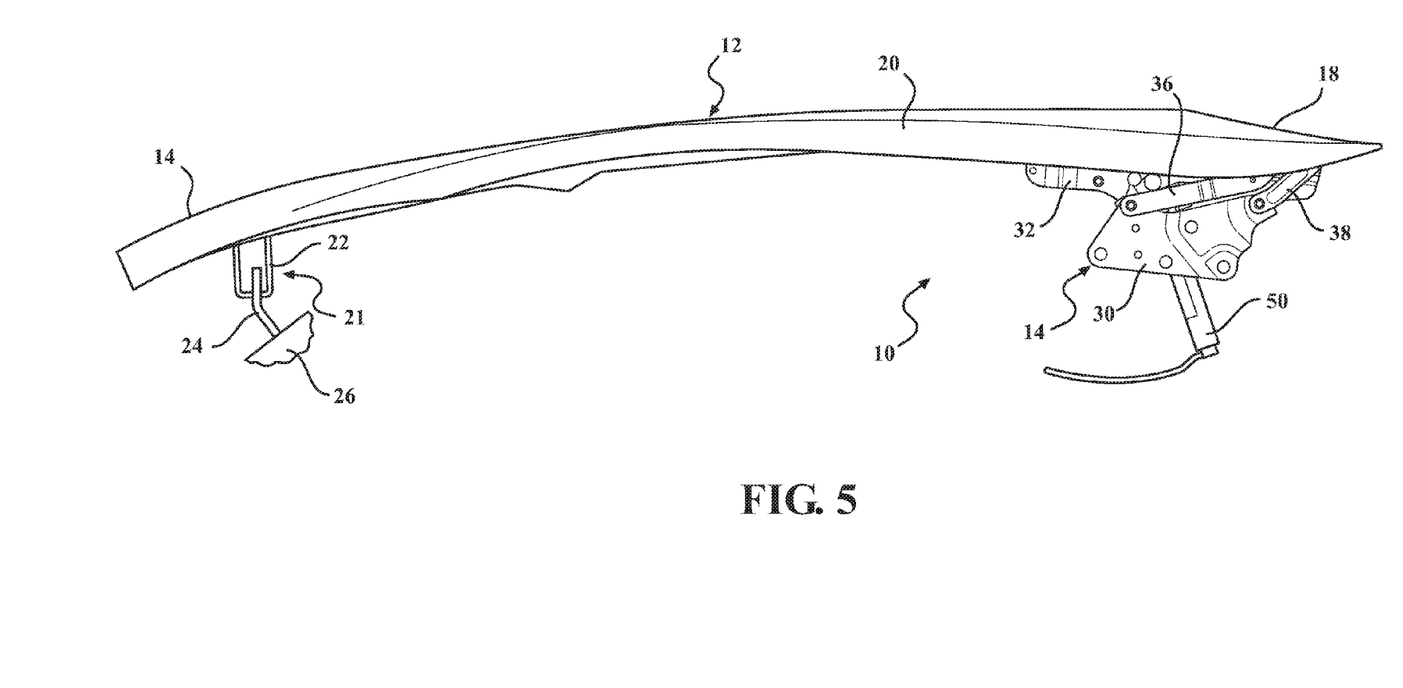
FIG. 5 is a side elevational view showing the vehicle hood assembly returned to its normal-closed position following resetting of the active hinge into its non-deployed condition.

FIG. 3 illustrates hood assembly 10 in an unlatched position with hood 12 released from latch device 21 and pivoted toward an open position as active hinge 14 is maintained in its deployed condition. FIG. 4 illustrates continued pivotal movement of hood assembly 10 into a reset position with hood 12 now shown pivoted into in a fully opened position whereat the primary latch of the latching mechanism has been re-engaged so as to shift active hinge 14 back into its non-deployed state. As such, subsequent pivotal movement of hood assembly 10 in a closing direction into its normal-closed position will permit hood 12 to be moved into latched engagement with latch device 21, as shown in FIGS. 1 and 5.

Figure 6:
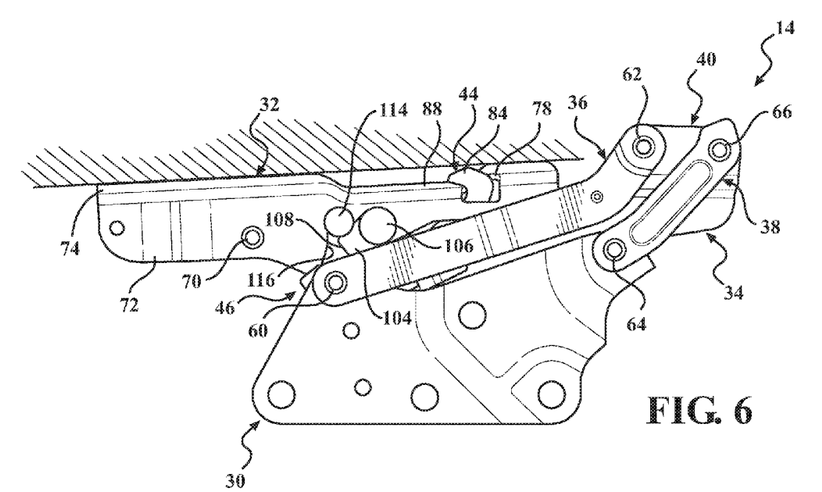
FIG. 6 is a side elevational view of the active hinge constructed according to a first embodiment of the present disclosure with a primary latch of a latching mechanism engaged for holding a pivot linkage mechanism in a retracted orientation to define the non-deployed condition shown in FIG. 1.
Figure 7:
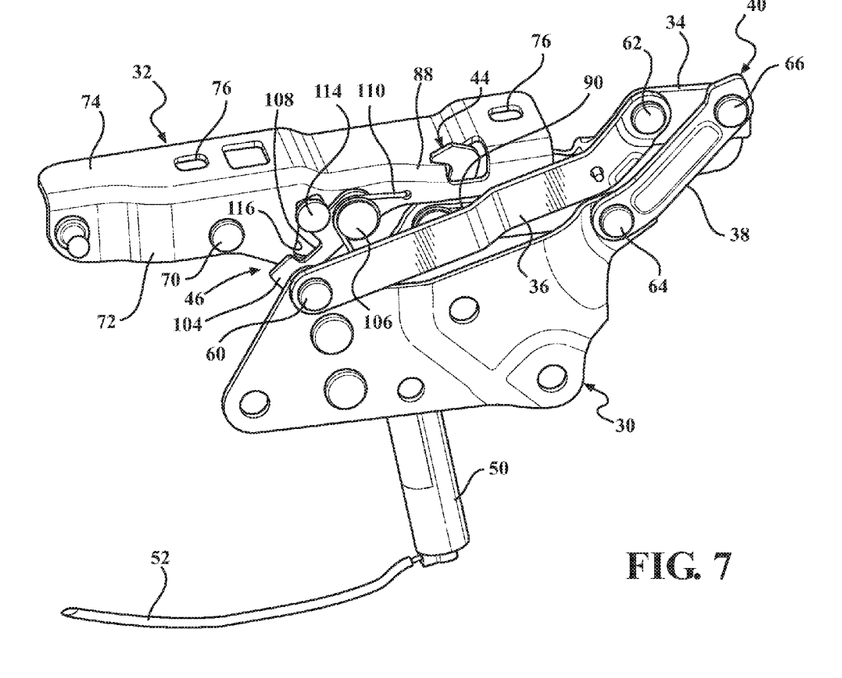
FIGS. 7 and 8 are front and back isometric views of the active hinge shown on FIG. 6 to better illustrate its structure and the interaction of the components.
Figure 8:
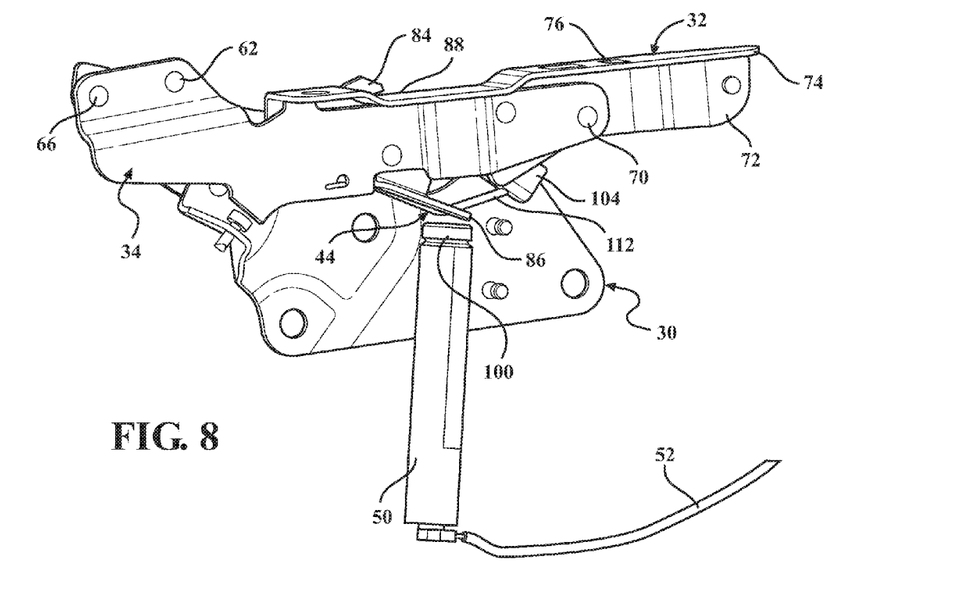

Referring now to FIGS. 6 through 8, a first example embodiment of active hinge 14 will now be described in sufficient detail to permit those skilled in the art to recognize and appreciate the structural and functional features provided by the present disclosure. Active hinge 14 is shown to generally include a body bracket 30, a hood bracket 32, a deploy bracket 34, and a pivot linkage mechanism interconnecting between body bracket 30 and deploy bracket 34. The pivot linkage mechanism has a first long link 36 and a second short link 38 arranged to define a four-bar linkage 40. Active hinge 14 further includes a latching mechanism 42 operably disposed between deploy bracket 34 and hood bracket 32 and having a primary latch 44 and a secondary latch 46. Hood bracket 32 is configured to be rigidly secured to an underside portion of rear segment 18 of hood 14 via suitable fasteners (not shown) while body bracket 30 is configured to be rigidly secured to a portion of the vehicle's body within the engine compartment by suitable fasteners (not shown). Finally, active hinge 14 includes an actuator 50 operable to selectively release primary latch 44 in response to a control signal being provided by a controller associated with an active passenger protection control system in response to one or more vehicle-mounted sensors or other detection devices detecting the occurrence of a pedestrian collision. In the example shown, actuator 50 includes an electrical connector 52 that would be in electrical connection with the sensor and/or the controller such that an electrical control signal is generated to control actuation of actuator 50.

Pivot linkage mechanism 40 is shown with first link 36 having one end pivotably connected to body bracket 30 via a first pivot pin 60 and its opposite end pivotably connected to deploy bracket 34 via a second pivot pin 62. Similarly, second link 38 is shown having a first end pivotably connected to body bracket 30 via a first pivot pin 64 and its second end pivotably connected to deploy bracket 34 via a second pivot pin 66. A pivot pin 70 pivotably connects a terminal end segment of deploy bracket 34 to a wall segment 72 of hood bracket 32. A flanged wall segment 74 of hood bracket 32 includes a series of mounting apertures 76 for attachment via fasteners to hood 12 and a primary latch slot 78.

Primary latch 44 includes a primary latch plate 80 pivotably mounted to deploy bracket 34 via a primary latch pivot pin 82. Primary latch plate 80 includes a capture flange 84 and an actuation flange 86. As shown in FIGS. 6 through 8, capture flange 84 is configured to extend through primary latch slot 78 in hood bracket 32 and normally engage a latch surface 88 on flange segment 74 for latching hood bracket 32 to deploy bracket 34. A primary latch biasing spring 90 is provided for normally biasing primary latch plate 80 in a latching direction (i.e., counterclockwise in FIGS. 6 and 7) so as to normally engage capture flange 84 with latch surface 88 on flange segment 74.

FIGS. 6-8 illustrate active hinge 14 in its non-deployed condition with primary latch 42 in an engaged or latched mode for releaseably coupling hood bracket 32 and deploy bracket 34 for common pivotal movement (via linkage mechanism 40) relative to body bracket 30 to provide normal movement of hood 12 between its latched and open positions. Primary latch 44 also includes a primary release lever 92 interconnected between actuation flange 86 and deploy bracket 34. As best seen in FIG. 8, a moveable actuator element 100 of actuator 50 is positioned in close proximity to actuation flange 86 of primary latch plate 80 and is operable, upon actuation of actuator 50, to forcibly move primary latch plate 80 from its engaged position to a released position, thereby shifting primary latch 44 into a released mode and permitting independent movement of hood bracket 32 to deploy bracket 34.

Secondary latch 46 includes a secondary latch plate 104 pivotably mounted to wall segment 72 of hood bracket 32 via a secondary latch pivot pin 106. Secondary latch plate 104 includes a capture slot 108. A secondary latch biasing spring 110 normally biases secondary latch plate 104 in a latching direction (clockwise in FIGS. 6 and 7). A secondary release lever 112 is also shown interconnecting secondary latch plate 104 to deploy bracket 34. As is also shown, an upstop pin 114 is fixed to deploy bracket 34 and is seated in a lost-motion slot 116 formed in wall segment 72 of hood bracket 32. With primary latch 44 in its latched mode, upstop pin 114 engages an end portion of lost-motion slot 116 to properly orient hood bracket 32 relative to deploy bracket 34 when active hinge 14 is in its non-deployed condition. As shown, in this position, the hood bracket 32 may be disposed generally in alignment with the deploy bracket 34, i.e., not pivoted relative to the deploy bracket 34. Note that in this condition, capture slot 108 of secondary latch plate 104 is displaced from engagement with upstop pin 114 so as to define the released mode of secondary latch 46.

Figure 9:
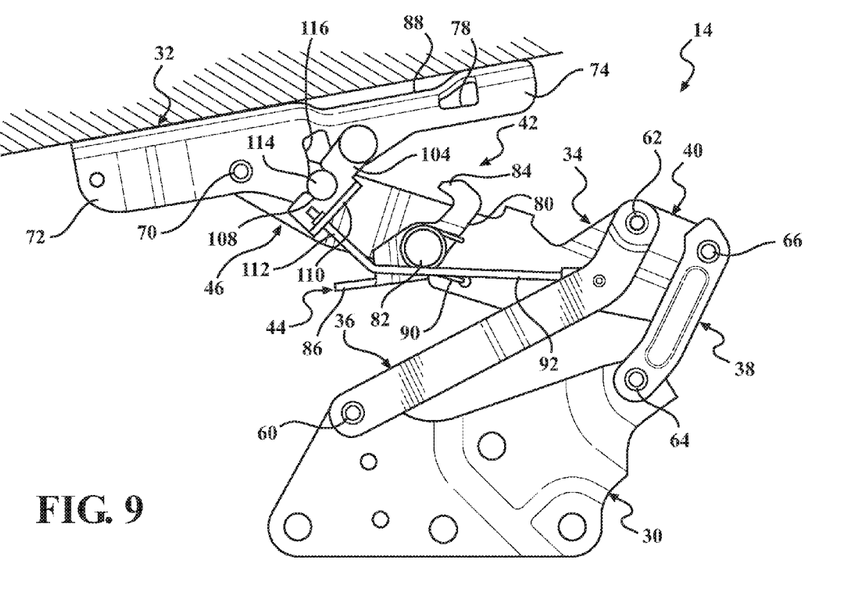
FIG. 9 is a side elevational view of the active hinge, similar to FIG. 6, but now showing the primary latch of the latching mechanism in a released mode and a secondary latch of the latching mechanism in a latched mode for holding the pivot linkage mechanism in an extended orientation to define the deployed condition shown in FIG. 2.

Referring now to FIG. 9, hood assembly 10 is shown in its deployed position with active hinge 14 operating in its deployed condition. Specifically, actuator 50 has engaged actuation flange 86 of primary latch plate 80 and caused pivotal movement thereof in a releasing direction, in opposition to the biasing of primary latch spring 90, so as to disengage capture flange 84 from latch surface 88, thereby shifting primary latch 44 in its released mode. Upon release of primary latch 44, pivot linkage 40 permits relative movement between deploy bracket 34 and hood bracket 32 until upstop pin 114 is located within capture slot 108 of secondary latch plate 104, thereby shifting secondary latch 46 into its engaged or latched mode. More specifically, the hood bracket 32 may pivot relative to the deploy bracket 34 in a first direction until upstop pin 114 is located within capture slot 108.

Figure 10:
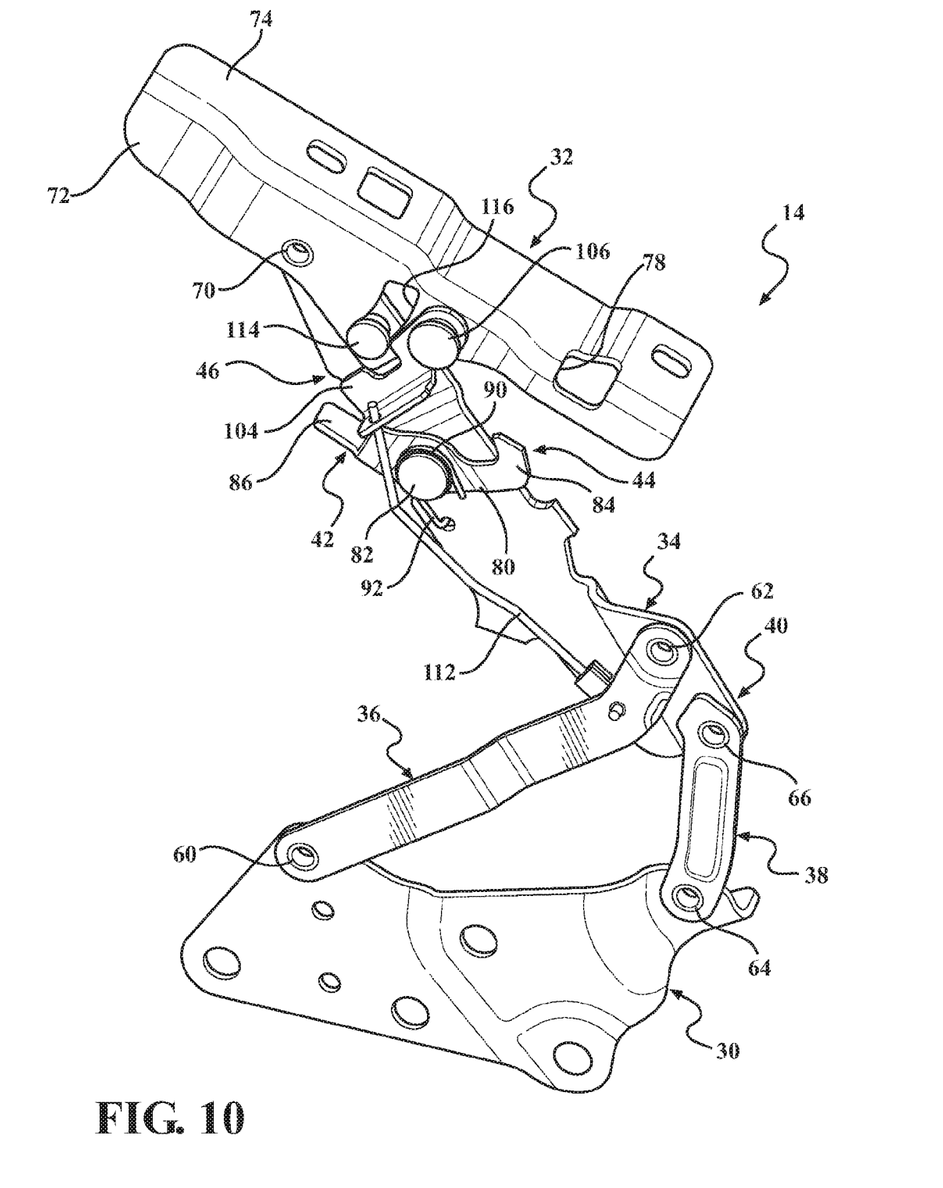
FIG. 10 is another side elevational view of the active hinge with both the primary and secondary latches of the latching mechanism in their released mode following unlatching of the hood to permit pivotal movement of the hood to the intermediate opened position shown in FIG. 3.
Figure 11:
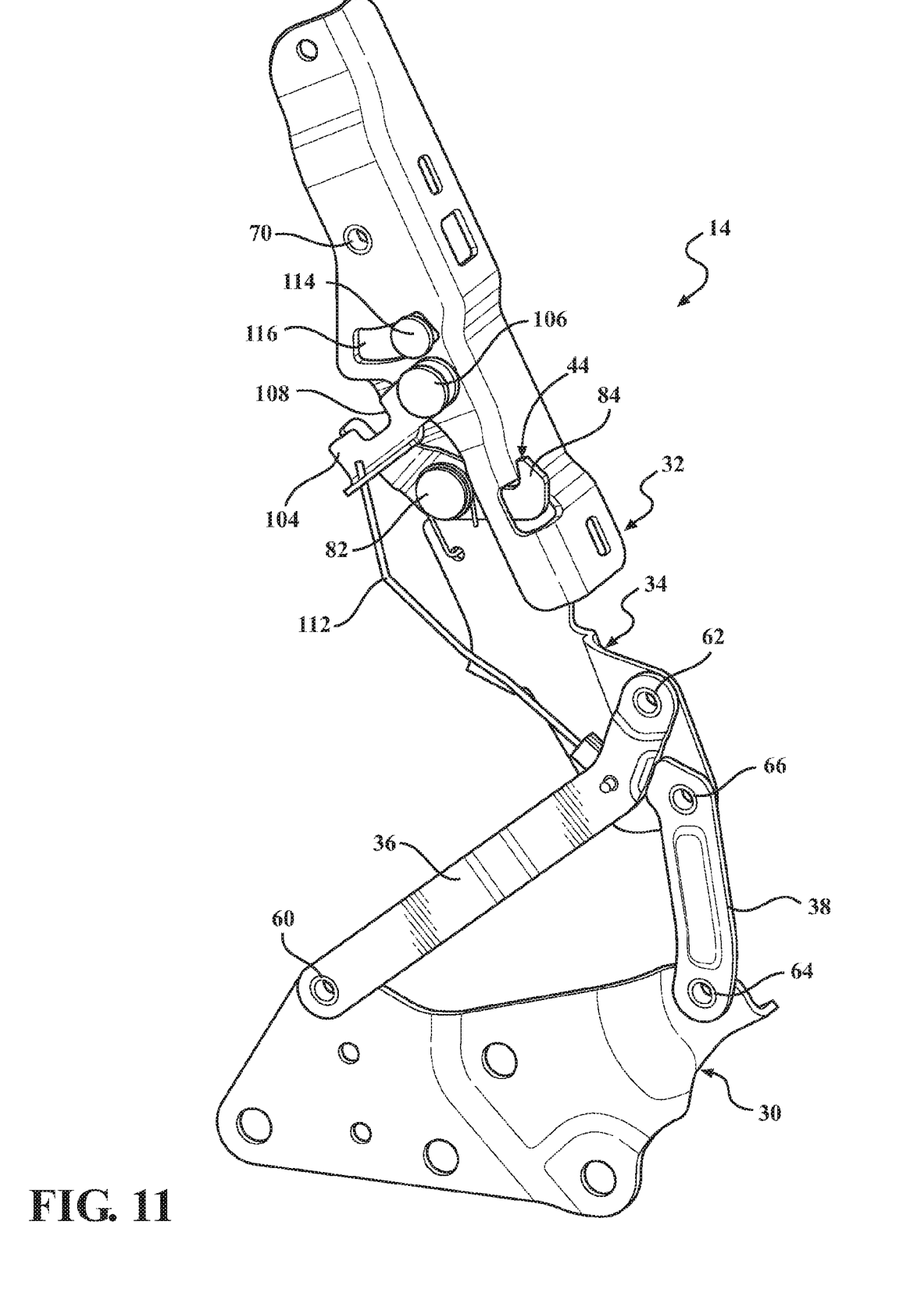
FIG. 11 is yet another side elevational view of the active hinge corresponding to movement of the hood to the fully open position of FIG. 4 and illustrating re-engagement of the primary latch of the latching mechanism for resetting the active latch in its non-deployed condition.

FIG. 10 illustrates active hinge 14 in its deployed condition after hood 12 has been unlatched and pivoted upwardly toward its intermediate open position of FIG. 3 at the start of the reset process. As seen, such rotation of hood 12 causes concurrent movement of hood bracket 32 relative to deploy bracket 34 which causes secondary release lever 112 to hold secondary latch plate 104 such that upstop pin 114 is released from capture slot 108, thereby shifting secondary latch 46 into its released mode while primary latch 44 is maintained in its released mode. FIG. 11 illustrates continued upward pivotal movement of hood 12 to its fully open or reset position similar to FIG. 4. As seen, this continued rotation causes hood bracket 32 to pivot relative to deploy bracket 34 until primary latch 44 is returned to its latched mode, thereby resetting active hinge 14 in its non-deployed condition. More specifically, the hood bracket 32 may pivot in a second direction, opposite the first direction, until the primary latch 44 is returned to its latched mode. As such, hood 12 can subsequently be returned to its latched and lowered position with hood assembly 10 is in its normal-closed position shown in FIGS. 1 and 5. As recognized, FIGS. 1 through 5 provide a sequential series of illustrations depicting the non-deployment, deployment and subsequent resetting of active hinge 14 utilizing latch mechanism 42 to provide two distinct mechanical connections between hood bracket 32 and deploy bracket 34.

Figure 12:
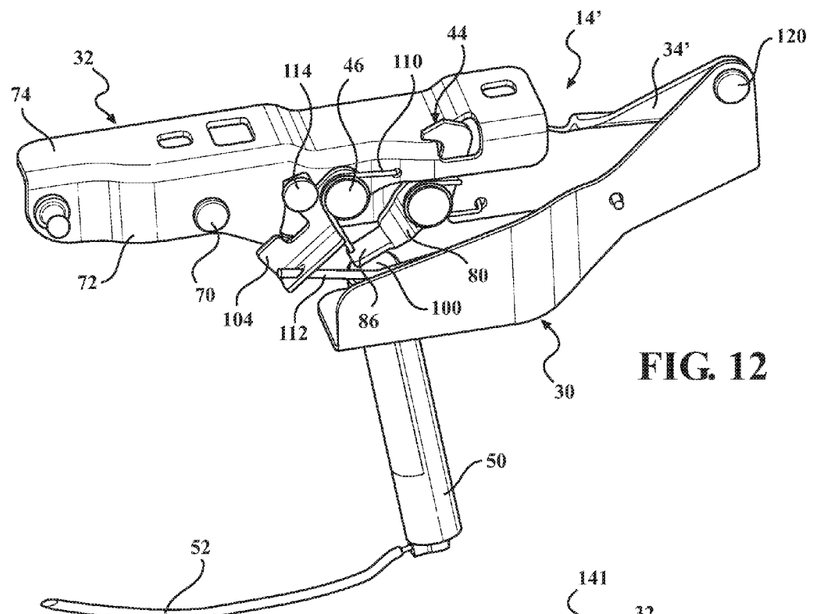
FIGS. 12 and 13 are front and rear isometric views of an active hinge constructed in accordance with an alternative embodiment of the present disclosure and which is applicable for use with the vehicle hood assembly shown in FIGS. 1 through 5 in substitution for the active hinge shown in FIGS. 6 through 11.
Figure 13:
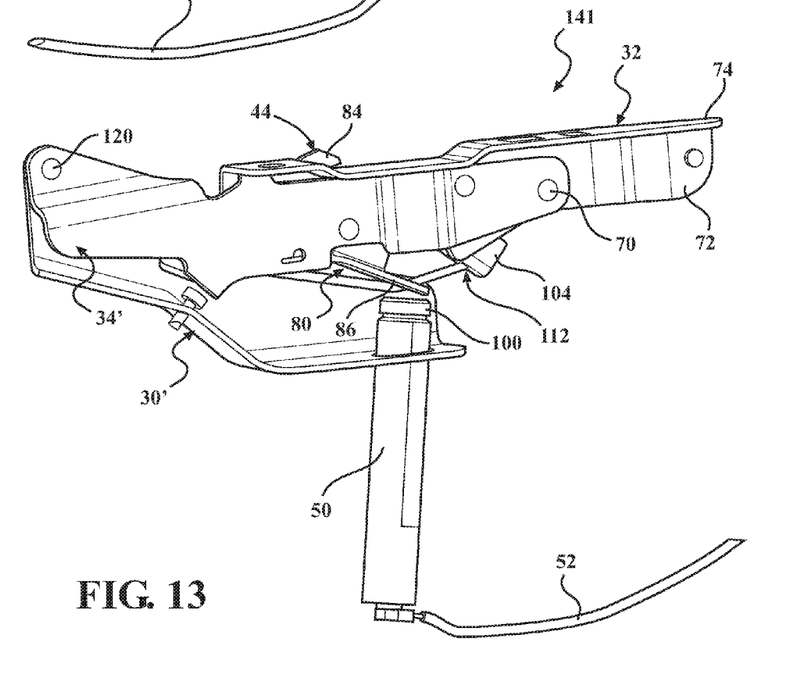

FIGS. 12 and 13 illustrate a second example embodiment of an active hinge 14' which is generally similar to active hinge 14 except that four-bar pivot linkage mechanism 40 has been replaced with a single pivot connection 120 between body bracket 30' and deploy bracket 34'. However, the integration of latching mechanism 42 between deploy bracket 34' and hood bracket 32 remains the same in both structure and function to provide both primary latch 44 and secondary latch 46 therebetween.

In accordance with the present disclosure, an active hinge is disclosed that employs a latching mechanism to maintain the hinge in its non-deployed and deployed conditions. A first latch is used to releaseably maintain the hinge in its non-deployed state while a second latch is used to releaseably maintain the hinge in its non-deployed state. A reset function is provided by which both latches are initially released and then the first latch is subsequently re-engaged to re-establish the non-deployed condition allowing closure of the hood to its normal use position following a pedestrian collision event.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in that particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or later, or intervening element or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to described various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An active hinge comprising:
   a hood bracket for attachment to a vehicle hood;
   a body bracket for attachment to a vehicle body;
   a deploy bracket pivotably attached to said hood bracket and said body bracket, said hood bracket being pivotable relative to said deploy bracket between a non-deployed position and a deployed position;
   a latch mechanism having a primary latch operable for releaseably latching said hood bracket to said deploy bracket in said non-deployed position and a secondary latch operable for releaseably latching said hood bracket to said deploy bracket in said deployed position; and
   an actuator for releasing said primary latch and permitting movement of said hood bracket to its deployed position.

2. The active hinge of claim 1 wherein said deploy bracket is pivotably coupled to said body bracket via a pivot linkage mechanism.

3. The active hinge of claim 1 wherein said deploy bracket is pivotably coupled to said body bracket via a single pivot connection.

4. The active hinge of claim 1 wherein said primary latch includes a primary latch plate pivotably supported from said deploy bracket for movement between a released position and a latched position, and a primary biasing spring normally biasing said primary latch plate toward its latched position, wherein said primary latch plate is operable in its latched position to engage a latch surface of said hood bracket and retain said hood bracket in its non-deployed position, and wherein said primary latch plate is operable in its released position to disengage said latch surface and permit movement of said hood bracket to its deployed position.

5. The active hinge of claim 4 wherein said hood bracket defines a primary latch slot and a latch surface adjacent to said primary latch slot; and said primary latch plate includes a capture flange for extending through said primary latch slot in engagement with said latch surface when said primary latch is in said latched position.

6. The active hinge of claim 5 wherein said primary latch plate further includes an actuation flange spaced from said capture flange for being engaged by said actuator for providing said pivoting movement of said primary flange from said latched position to said released position.

7. The active hinge of claim 4 wherein said secondary latch includes a secondary latch plate pivotably supported from said hood bracket for movement between a released position and a latched position, and a secondary biasing spring for normally biasing said secondary latch plate toward its latched position, wherein said secondary latch plate is operable in its latched position to engage a stop pin fixed to said deploy bracket so as to retain said hood bracket in its deployed position, and wherein said secondary latch plate is operable in its released position to disengage said stop pin and permit movement of said hood bracket to a reset position relative to said deploy bracket.

8. The active hinge of claim 7 wherein movement of said hood bracket to its reset position permits said primary latch plate to return to its latched position while said secondary latched plate is maintained in its released position.

9. An active hinge comprising:
   a hood bracket for attachment to a vehicle hood;
   a body bracket for attachment to a vehicle body;
   a deploy bracket pivotably attached to said hood bracket and said body bracket, said hood bracket being pivotable relative to said deploy bracket between a non-deployed position and a deployed position, wherein said hood bracket is generally disposed in alignment with said deploy bracket in said non-deployed position, and wherein said hood bracket is pivoted relative to said deploy bracket in said deployed position;
   an upstop pin fixed to and extending from said deploy bracket;
   a primary latch pivotably attached to said deploy bracket and moveable between a latched position and a released position, wherein said primary latch engages said hood bracket when said primary latch is in said latched position to secure said hood bracket in said non-deployed position, and wherein said primary latch is spaced from said hood bracket when said primary latch is in said released position to permit said hood bracket to pivot relative to said deploy bracket into said deployed position;
   a secondary latch pivotably connected to said hood bracket and moveable between a latched position and a released position, wherein said secondary latch engages said upstop pin in said latched position to retain said hood bracket in said deployed position, and wherein said secondary latch is spaced from said upstop pin in said released position to permit movement of said hood bracket out of said deployed position; and
   an actuator for releasing said primary latch and permitting movement of said hood bracket to its deployed position.

10. The active hinge of claim 9 wherein said deploy bracket is pivotably coupled to said body bracket via a pivot linkage mechanism.

11. The active hinge of claim 9 wherein said deploy bracket is pivotably coupled to said body bracket via a single pivot connection.

12. The active hinge of claim 9 wherein said primary latch includes a primary latch plate pivotably supported from said deploy bracket for movement between said released position and said latched position, and a primary biasing spring normally biasing said primary latch plate toward said latched position, wherein said primary latch plate is operable in said latched position to engage said hood bracket to retain said hood bracket in said non-deployed position, and wherein said primary latch plate is operable in said released position to disengage said hood bracket to permit movement of said hood bracket to said deployed position.

13. The active hinge of claim 12 wherein said hood bracket defines a primary latch slot and a latch surface adjacent to said primary latch slot; and said primary latch plate includes a capture flange extending through said primary latch slot in engagement with said latch surface when said primary latch is in said latched position.

14. The active hinge of claim 13 wherein said primary latch plate further includes an actuation flange spaced from said capture flange and positioned adjacent to said actuator for being engaged by said actuator for providing said pivoting movement of said primary flange from said latched position to said released position.

15. The active hinge of claim 12 wherein said secondary latch includes a secondary latch plate pivotably supported from said hood bracket for movement between said released position and said latched position, and a secondary biasing spring for normally biasing said secondary latch plate toward said latched position, wherein said secondary latch plate is operable in said latched position to engage said stop pin so as to retain said hood bracket in said deployed position, and wherein said secondary latch plate is operable in said released position to disengage said stop pin and permit movement of said hood bracket to a reset position relative to said deploy bracket.

16. The active hinge of claim 15 wherein movement of said hood bracket to its reset position permits said primary latch plate to return to its latched position while said secondary latched plate is maintained in said released position.

17. A method for operating an active hinge, said method comprising:
   providing a hood bracket for attachment to a vehicle hood;
   providing a body bracket for attachment to a vehicle body;
   providing a deploy bracket pivotably attached to the hood bracket and the body bracket and having an upstop pin extending therefrom;
   providing a primary latch being pivotably attached to the deploy bracket;
   providing a secondary latch being pivotably attached to the hood bracket and defining a capture slot;
   pivoting the primary latch relative to the deploy bracket from a latched position to a released positon, wherein the primary latch engages the hood bracket in the latched position to secure the hood bracket to the deploy bracket in a non-deployed position of the hood bracket, and wherein the primary latch is spaced from the hood bracket in the released position to allow the hood bracket to pivot relative to the deploy bracket into a deployed position of the hood bracket; and
   pivoting the hood bracket relative to the deploy bracket in a first direction from the non-deployed position into the deployed position and receiving the upstop pin in the capture slot of the secondary latch to retain the hood bracket in the deployed position.

18. The method of claim 17 further including pivoting the hood bracket relative to the deploy bracket in a second direction opposite the first direction; removing the upstop pin from the capture slot to allow the hood bracket to be pivoted away from the non-deployed position; and engaging the hood bracket with the primary latch to reset the hood bracket into the non-deployed position.

19. The method of claim 17 wherein pivoting the primary latch relative to the deploy bracket from a latched position to a released positon includes activating an actuator to move a moveable actuator element of the actuator against the primary latch to provide the pivoting movement of the primary latch.

20. The method of claim 19 wherein the actuator is activated in response to a control signal provided by a controller in response to the detection of the occurrence of a collision.

* * * * *